United States Patent [19]
Gundy

[11] Patent Number: 5,738,359
[45] Date of Patent: Apr. 14, 1998

[54] EXPANDABLE BAND AND LOCKING MECHANISM FOR INSTALLING A FLEXIBLE SEALING ELEMENT

[75] Inventor: William P. Gundy, Milford, N.H.

[73] Assignee: NPC Acquisition Corp., Milford, N.H.

[21] Appl. No.: 801,945

[22] Filed: Feb. 14, 1997

Related U.S. Application Data

[60] Provisional application No. 60/012,155 Feb. 23, 1996.

[51] Int. Cl.$^6$ ............................................. F16J 15/06
[52] U.S. Cl. ........................... 277/606; 277/616; 285/237; 24/20 R
[58] Field of Search .............................. 277/9, 11, 146, 277/147, 207 A; 285/236, 237, 162, 169; 24/20 R, 23 EE, 20 CW, 20 EE

[56] References Cited

U.S. PATENT DOCUMENTS

| | | |
|---|---|---|
| 3,899,183 | 8/1975 | Wild et al. . |
| 3,933,377 | 1/1976 | Arrowood ............................... 285/236 |
| 3,958,313 | 5/1976 | Rossborough . |
| 4,215,868 | 8/1980 | Skinner et al. . |
| 4,478,437 | 10/1984 | Skinner . |
| 4,543,691 | 10/1985 | Calmettes ............................... 24/20 R |
| 4,705,305 | 11/1987 | Ghaly . |
| 4,746,127 | 5/1988 | Westhoff et al. . |
| 4,890,863 | 1/1990 | Westhoff et al. . |
| 4,911,380 | 3/1990 | Regipa . |
| 4,954,004 | 9/1990 | Faber et al. . |
| 5,029,907 | 7/1991 | Gundy . |
| 5,054,794 | 10/1991 | Westhoff et al. . |

Primary Examiner—Scott W. Cummings
Attorney, Agent, or Firm—Daniel J. Bourque; Kevin J. Carroll

[57] ABSTRACT

An expandable band and locking mechanism is used to install and secure a flexible sealing element, such as a rubber seal or gasket, against an internal annular surface, such as in a manhole or pipe. The expandable band is capable of expanding and being locked at various diameters. The expandable band preferably has a plurality of deviations or ribs that provide a plurality of pressure points against the sealing element. The expandable band includes a first locking region, such as an end locking portion of the band, and a second locking region, such as one or more adjustable locking elements or notches in the band. The locking mechanism preferably includes a locking member having a first locking tab for engaging with the end locking portion of the band and a second locking tab for engaging with one of the adjustable locking elements or notches in the band. The locking mechanism further includes a housing for covering the locking member and engaging the band. An intermediate biasing member between the housing and the locking member, preferably made of an elastomeric material, biases the locking member toward locking engagement with the expandable band.

24 Claims, 9 Drawing Sheets

EXPANDABLE BAND AND LOCKING MECHANISM FOR INSTALLING A FLEXIBLE SEALING ELEMENT

RELATED APPLICATION

This application claims the benefit of Provisional Patent application Ser. No. 60/012,155 filed on Feb. 23, 1996.

FIELD OF THE INVENTION

The present invention relates to adjustable bands with locking mechanisms and in particular, to an expandable internal band with a locking mechanism for installing a flexible sealing element.

BACKGROUND OF THE INVENTION

Flexible sealing elements or gaskets are often used in tubular structures to seal an opening or joint, for example, to seal the joint between a pipe, manhole, or other structure. The sealing elements or gaskets are often secured by a band having a locking mechanism. In one example, an expandable internal band is installed inside the pipe and expands and locks in place to apply pressure against the sealing element or gasket, thereby securing the sealing element or gasket.

Prior art bands and locking mechanisms are limited in that they often cannot effectively secure a sealing element into various pipes or other similar structures over a variety of diameters. The prior art expandable bands are typically expandable only to one diameter and therefore have a limited overall expansion range. The prior art locking mechanisms are also not capable of quickly and securely locking the expandable bands over a variety of diameters. By not allowing adjustability over a variety of diameters, the prior art bands and locking mechanisms have limited ultimate sealing capabilities.

Accordingly, what is needed is an expandable band that is adjustable to expand and lock in a variety of diameters. An expandable band is also needed that provides an effective seal against a sealing element. What is also needed is a band locking mechanism that quickly and securely locks the band in any one of a variety of diameters.

SUMMARY OF THE INVENTION

The present invention features an expandable band locking mechanism, for locking an expandable band against a sealing element. The expandable band locking mechanism comprises a locking member having a first locking end for locking with a first locking region in the expandable band, and a second locking end for locking with a second locking region in the expandable band. The expandable band locking mechanism further includes a housing for substantially covering the locking member and for engaging with at least a portion of the expandable band. The expandable band locking mechanism further includes an intermediate biasing member for positioning between the locking member and the housing and for biasing the locking member toward a locked position.

According to the preferred embodiment, the locking member includes a base portion and a first locking tab extending from the base portion, for abutting a locking end portion of the expandable band that forms the first locking region of the band. At least a second locking tab extends from the base portion, for engaging one of a plurality of notches in the expandable band that form the second locking region of the band. The second locking tab preferably extends from the base portion at an angle with respect to the base portion.

According to the preferred embodiment, the housing includes at least first and second side members, for retaining or guiding the locking member on each side of the band. The side members include at least first and second band engaging members, for engaging the expandable band. One example of the intermediate biasing member is made of an elastomeric material positioned between the locking member and the housing, although any spring or biasing member will suffice.

The expandable band locking mechanism is preferably used together with an expandable band as an expandable sealing mechanism to adjustably seal a sealing element against a surface. The locking member engages a locking end region and one of a plurality of adjustable locking elements on the expandable band such that the locking member is capable of moving to a subsequent one of the adjustable locking elements when the expandable band is expanded. The second locking tab of the locking member preferably extends at an angle with respect to the base portion to engage one of the adjustable locking elements or notches in a manner that allows the locking member to move in a first direction to subsequent notches and that prevents the locking member from moving back in a second direction opposite the first direction. The intermediate biasing member biases the second locking tab toward locking engagement with the notches.

The expandable band preferably includes a plurality of protruding deviations or ribs, for providing multiple pressure points against the sealing element. The plurality of ribs are preferably formed by corrugations extending lengthwise along the expandable band.

DESCRIPTION OF THE DRAWINGS

These and other features and advantages of the present invention will be better understood by reading the following detailed description, taken together with the drawings wherein.

DESCRIPTION OF THE INVENTION

Figure 1A:
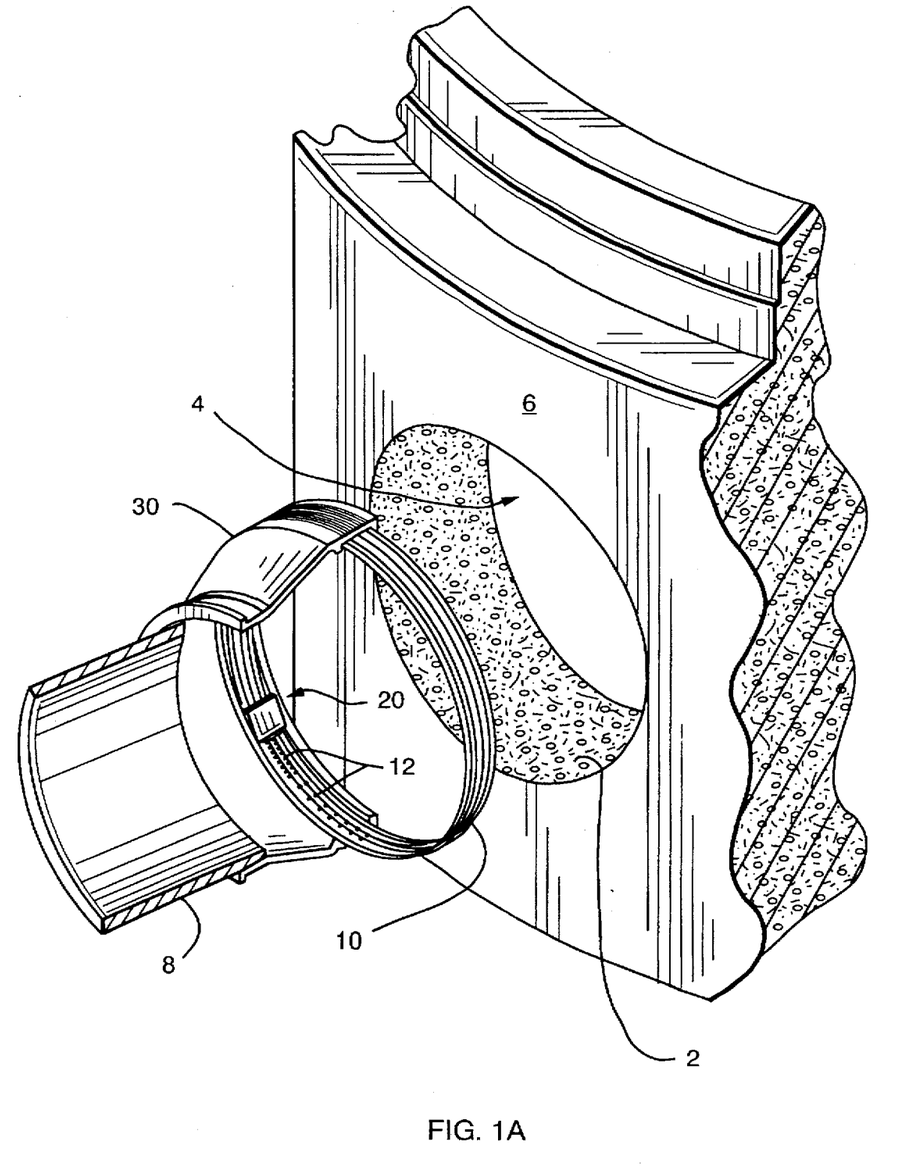
FIGS. 1A–1B are partial cross-sectional perspective views of an expandable band and locking mechanism, according to the present invention, for installing a flexible sealing element.
Figure 1B:
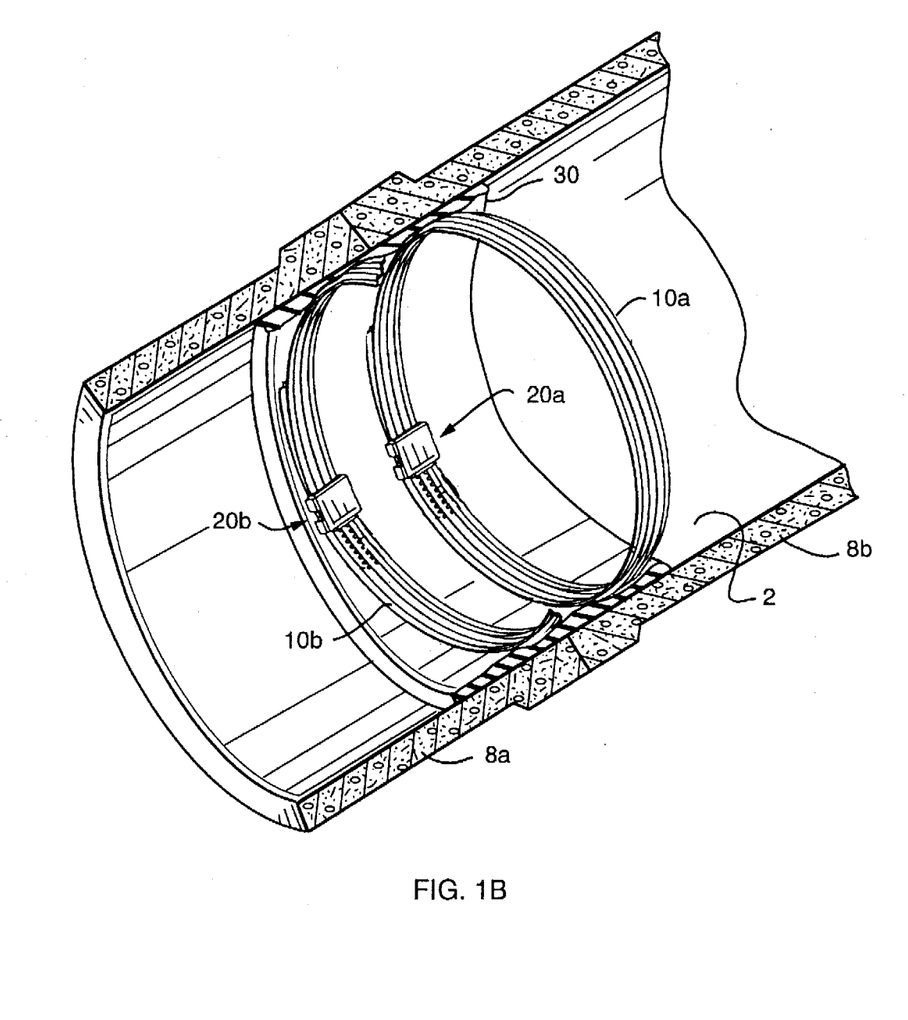

An expandable sealing mechanism according to the present invention includes expandable band 10, FIGS. 1A–1B, and a locking mechanism 20 used to install and secure a flexible sealing element 30, such as a rubber seal or gasket, against an interior surface 2 of a manhole. In one example, the band 10, FIG. 1A, is used to secure the flexible sealing element 30 into a hole 4 in a manhole 6, for coupling the manhole 6 to a pipe 8. Alternatively, one or more expandable bands 10a, 10b, FIG. 1B, are used to secure a flexible sealing element 30 between two pipes 8a, 8b or other similar hollow members.

The expandable band 10, preferably made of a steel or other suitable material, is expanded against the sealing element 30 within the hole 4 with an expanding mechanism, as will be described in greater detail below. The locking mechanism 20 is used to lock or secure the expandable band 10 in the expanded position against the sealing element 30.

The expandable band 10 includes one or more locking regions, such as adjustable locking elements or lock notches 12, which are engaged by the locking mechanism 20 when the expandable band 10 is expanded. The expandable band 10 preferably includes a plurality of lock notches 12 spaced along the expandable band 10 so that the expandable band 10 can be expanded and locked over a wide range of diameters. One advantage of the expandable band 10 of the present invention is that a single expandable band 10 is capable of sealing a flexible sealing element 30 into a large range of hole dimensions. In one example, the lock notches 12 are positioned to allow a range of expansion/contraction in about ⅛ inch increments over a diameter range of at least 1 in., although the present invention contemplates any possible range.

Figure 2:
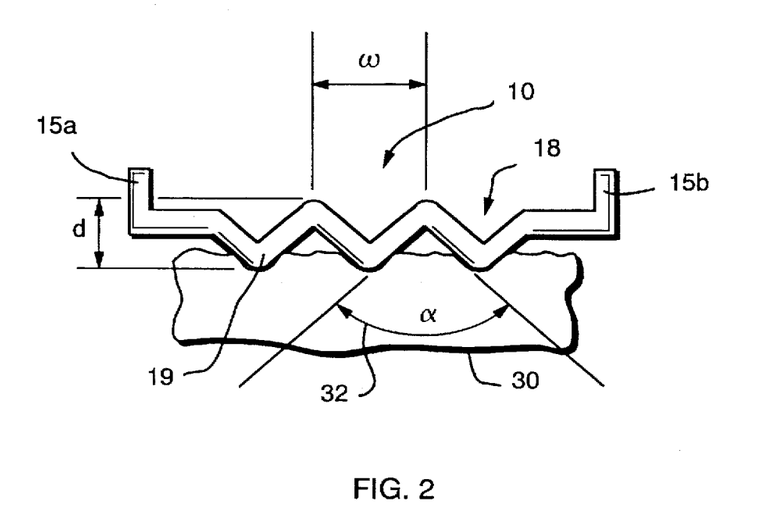
FIG. 2 is a cross-sectional view of a corrugated expandable internal band according to one embodiment of the present invention.

The expandable band 10, FIG. 2, preferably includes a plurality of protruding undulations, deviations or ribs 19 which provide multiple pressure points against the sealing element 30 to achieve maximum performance of the seal. The preferred embodiment of the band 10 has a corrugated or undulating cross-section with one or more corrugations 18 to provide stiffness and form the ribs 19. The expandable band 10 having multiple ribs 19 provides a more effective seal than a flat band because the rubber or flexible material of the sealing element 30 will not squeeze or be pushed to the outside of the band and the corrugated band 10 provides multiple pressure points against the rubber or flexible material.

In one example, the angle 32 formed by each corrugation 18 is approximately 90 degrees, the width w of each corrugation 18 is approximately 0.3 inches and the depth d of each corrugation 18 is approximately 0.188 inches. The present invention, however, contemplates a corrugated expandable band 10 having various configurations, dimensions, and different undulation shapes.

In another embodiment, the expandable band 10 includes side members 15a, 15b disposed generally perpendicular to the expandable band 10, which serve to stiffen the band.

Figure 3:
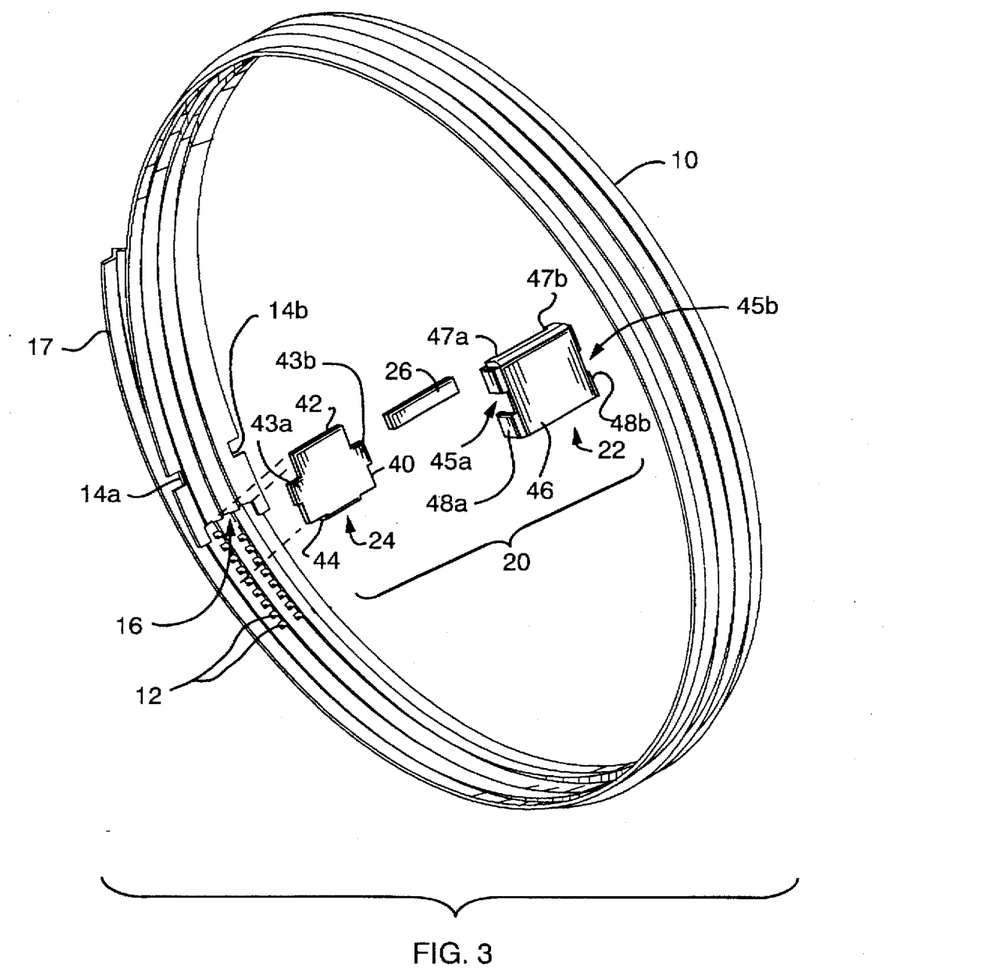
FIG. 3 is an expanded view of one embodiment of a locking mechanism used to lock the expandable band according to the present invention.

The preferred embodiment of the locking mechanism 20, FIG. 3, includes a housing 22, a locking member 24 and an intermediate biasing member 26 that cooperate to lock the expandable band 10 in an expanded position. One example of the locking member 24 includes a plate-like body portion 40 made from a stainless steel or other suitable material. The locking member 24 includes a first locking end or tab 42 extending from the body portion 40, for engaging or abutting a first locking region or end locking portion 16 in the expandable band 10. The locking member 24 further includes a second locking end or tab 44 extending from the body portion 40, for abutting against or engaging with a second locking region 12 such as a lock notch proximate the other end 17 of the expandable band 10. The locking member 24 further includes one or more side members or tabs 43a, 43b extending from the base portion, for engaging with the housing 22.

The housing 22 includes a body portion 46 preferably formed from a stainless steel or other suitable material. One or more side members 48a, 48b extend from each side of the body portion 46, for retaining the locking member 24 against the expandable band 10. One or more band engaging tabs 47a, 47b on the housing 22 engage with notches 14a, 14b in the band 10, facilitating sliding of the housing 22 together with the band 10 during adjustment. The housing 22 also includes side regions 45a, 45b on each side of the housing 22, for receiving corresponding side tabs 43a, 43b on the locking member 24.

The intermediate biasing member 26 is positioned generally between the housing 22 and locking member 24, for biasing the locking member 24 toward locking engagement with the expandable band 10 by applying down pressure on the locking member 24. One example of the intermediate biasing member 26 is made of an elastomeric material; although the present invention contemplates using a spring or other type of biasing member as an intermediate biasing member.

As discussed below, the housing 22 and locking member 24 are stamped and formed as finished parts. The housing 22, locking member 24 and intermediate biasing member 26 are then assembled and snapped into engagement with the expandable band 10.

Figure 4:
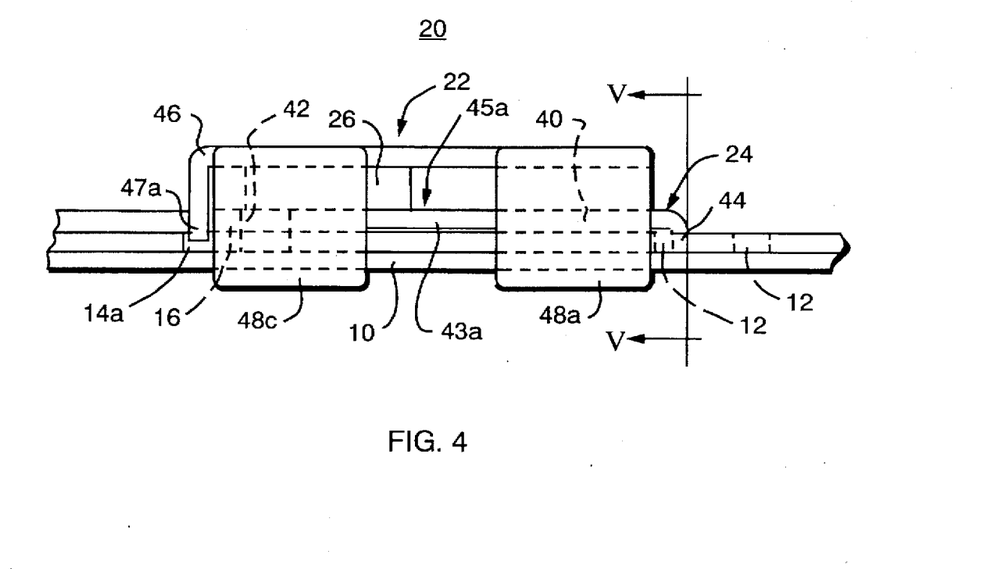
FIG. 4 is a side view of the locking mechanism of FIG. 3 locking an expandable band according to the present invention.

When the locking mechanism 20, FIG. 4, is assembled on the expandable band 10, the first locking tab 42 abuts against the end locking portion 16 of the expandable band 10 and the second locking tab 44 extends into and engages one of the notches 12 in the expandable band 10. In a locked position, the locking member 24 is preferably captured between the lock notches 12 and the end locking portion 16 of the expandable band 10 such that no locking pressure is placed on the housing 22. The housing 22 is disposed over the locking member 24 to guide and retain the locking member 24 as the locking mechanism 20 is adjusted or moved to subsequent locking positions while the band 10 is expanded.

Two side members 48a, 48c preferably extend on each side of the housing 22 and along each side of the locking member 24 and the expandable band 10. Each side tab 43a of the locking member 24 extends into the side region 45a formed by the two side members 48a, 48c on each side of the housing 22 so that the locking member 24 will move with the housing 22 when the band 10 is expanded. Each band engaging tab 47a, 47b of the housing 22 engages with respective notches 14a, 14b in the expandable band 10 so that the housing 22 slides along with the band during expansion or adjustment of the expandable band 10.

Figure 5:
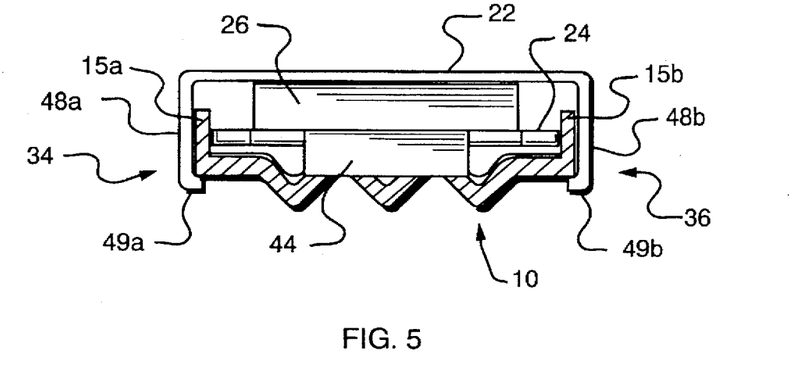
FIG. 5 is an end partial cross-sectional view of the locking mechanism of FIG. 3, according to the present invention.

The one or more side members 48a, 48b, FIG. 5, on each side 34, 36 of the band 10 preferably include band engaging portions 49a, 49b extending beneath the expandable band 10. The band engaging portions 49a, 49b engage the expandable band 10 so that the housing 22 causes the intermediate biasing member 26 to apply pressure against the base portion 40 of the locking member 24, thereby biasing the second locking tab 44 toward locking engagement with notches 12 of the expandable band 10. One embodiment of the expandable band 10 further includes one or more side members 15a, 15b that guide the locking member 24 during adjustment of the expandable band 10.

Figure 6:
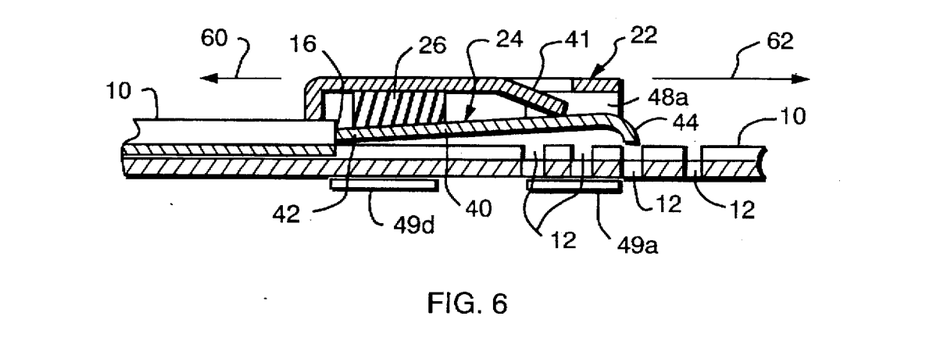
FIG. 6 is a side cross-sectional view of a locking mechanism according to another embodiment of the present invention.

The second locking tab 44, FIG. 6, preferably extends at an angle with respect to the base portion 40 such that the second locking tab 44 slides out of engagement with one of the notches 12 when the locking member 24 moves substantially in the direction indicated by arrow 60 as the band 10 expands. As the expandable band 10 expands and the locking member 24 moves in the direction indicated by arrow 60, the second locking end 44 of the locking member 24 moves to and engages with subsequent notches 12, similar to a ratchet mechanism, until the expandable band 10 is at the desired expansion diameter. At the desired expansion diameter, the second locking tab 44 is biased into locking engagement with a corresponding notch 12 and the locking member 24 is prevented from moving in the opposite direction 62, thereby locking the expandable band 10 in the expanded position.

The housing 22 optionally includes locking member engaging tab 41 that engages and exerts a force against locking member 24 to further maintain the locking member 24 into locking engagement. The housing 22 having the locking member engaging tab 41 can be used with or without the intermediate biasing member 26. In one example, the locking member engaging tab 41 is bent into engagement with the locking member with a screwdriver or similar tool. The expandable band 10 can be unlocked by relieving the pressure on the locking member 24, for example, by lifting the locking member 24 with a screwdriver or similar tool.

Figure 7A:
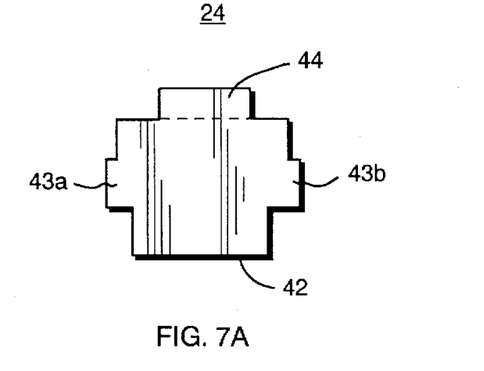
FIGS. 7A–7B are top views of the locking member, according to various embodiments used in the locking mechanism.
Figure 7B:
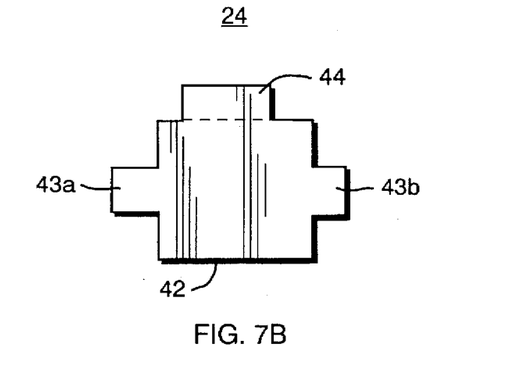

The locking member 24, FIGS. 7A and 7B, includes some possible alternative shapes and dimensions. The first locking end or tab 42 is preferably dimensioned to fit within end locking portion 16 of the expandable band 10, and the side tabs 43a, 43b are preferably dimensioned to match the side regions 45a, 45b of the housing 22. One way of forming the locking member 24 is by stamping the body portion 40 of the locking member 24 from steel or another suitable material and bending second locking end or tab 44 downward.

Figure 8A:
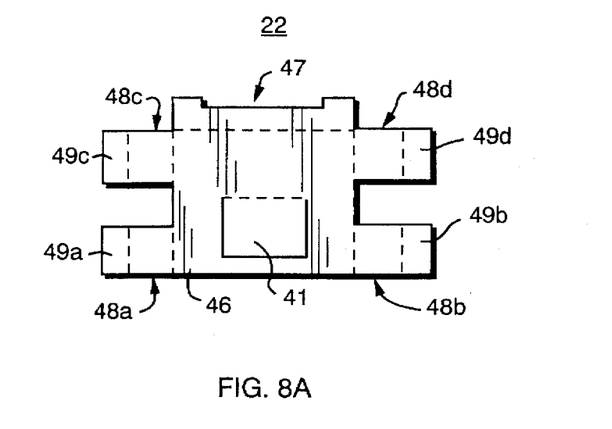
FIGS. 8A–8B are top views of the housing, according to various embodiments used in the locking mechanism of the present invention.
Figure 8B:
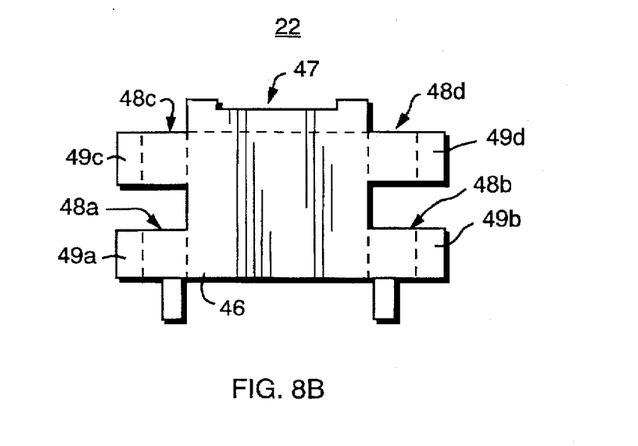

The housing 22, FIGS. 8A and 8B, includes some possible alternative shapes and dimensions corresponding to the locking mechanism 24. The housing 22 is dimensioned to at least partially cover a locking member 24 and to engage with the band. One way of forming the housing 22 is by stamping the body portion 46 of the housing 22 from steel or another suitable material. The body portion 46 of the housing 22 is configured so that the side members 48a–48c can be bent downward and the band engaging members 49a–49c can be bent prior to engagement beneath the expandable band 10.

Figure 9A:
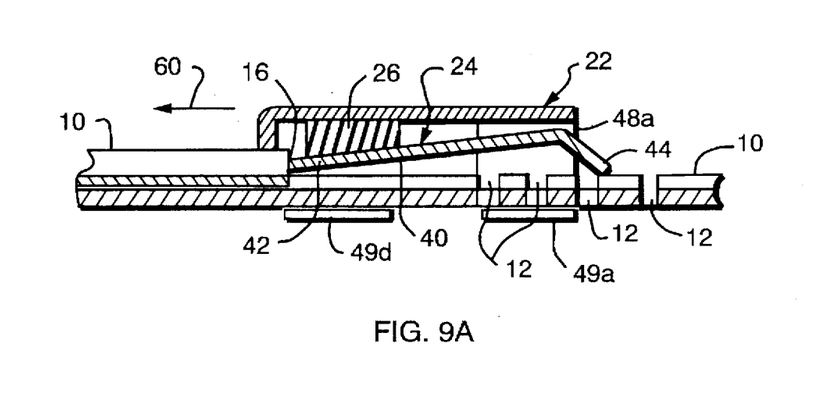
FIGS. 9A–9B are side cross-sectional views of the locking mechanism according to a further embodiment of the present invention.
Figure 9B:
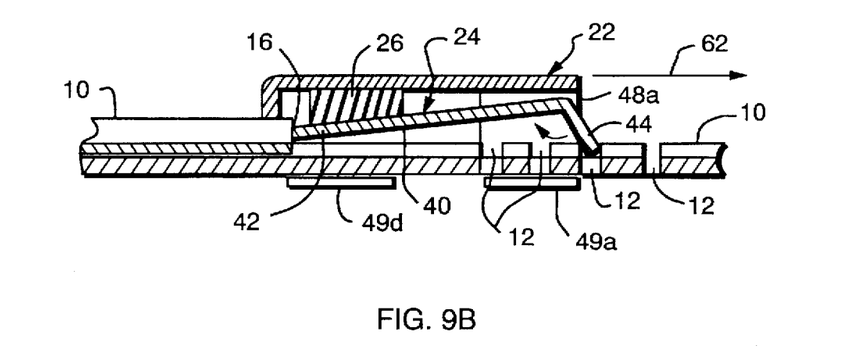

According to further embodiment, the locking member 24, FIGS. 9A–9B, includes locking tab 44 forming an obtuse angle relative to the body portion 40 of the locking member 24. The obtuse angle facilitates sliding of the locking member 24, FIG. 9A in the direction of arrow 60 during expansion of the band 10. When the locking tab 44, FIG. 9B, engages the notch 12 at the desired diameter, the locking tab 44 will bend to a smaller or lesser obtuse angle with respect to the base portion 40 so that the locking tab 44 locks in the notch 12, thereby providing a self-locking mechanism. This type of locking member 24 having self-locking tab 44 can be used with or without intermediate biasing member 26.

Figure 10:
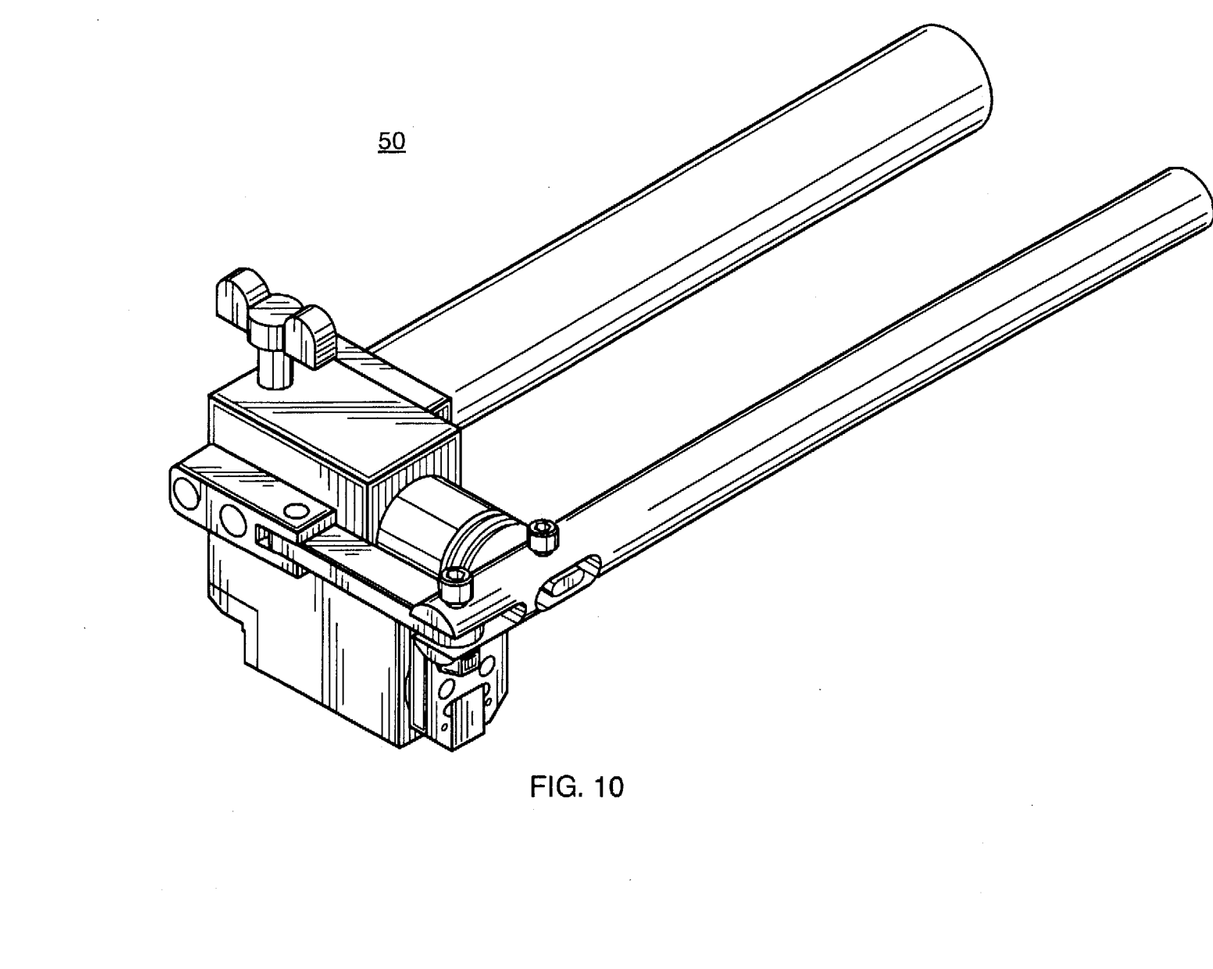
FIG. 10 is a perspective view of an expanding mechanism used to expand and secure the internal band and locking mechanism within a hole.

An exemplary expanding mechanism 50, FIG. 10, is typically used to install the expandable band 10 with locking mechanism 20. The expanding mechanism 50 applies pressure between the inside ends of the expandable band 10 to cause the expandable band 10 to expand and seal against the sealing element. As the expanding mechanism 50 expands the expandable band 10, the locking end 44 of the locking member 24 moves to subsequent lock notches in the expandable band similar to a ratchet mechanism. When the desired expansion of the band 10 is reached, the locking end 44 engages a corresponding lock notch to lock the band in an expanded position and the expanding mechanism 50 can be removed.

Accordingly, the expandable sealing mechanism according to the present invention provides an adjustable locking mechanism that allows an expandable band to be easily adjusted and locked in a range of diameters. The locking mechanism quickly and securely locks the expandable band as the band is expanded. The expandable sealing mechanism also includes an expandable band that provides an effective seal with multiple pressure points against a seal element, such as a rubber gasket.

Modifications and substitutions by one of ordinary skill in the art are considered to be within the scope of the present invention which is not to be limited except by the claims which follow.

What is claimed is:

1. An expandable band locking mechanism, for locking an expandable band against at least one sealing element, said expandable band locking mechanism comprising:

a locking member having a first locking end, for locking with a first locking region in said expandable band, and having a second locking end for locking with a second locking region in said expandable band;

a housing, for at least partially covering said locking member and for engaging with at least a portion of said expandable band; and an intermediate biasing member, positioned between said locking member and said housing, for biasing said locking member into a locked position.

2. The expandable band locking mechanism of claim 1, wherein said locking member includes a base portion and a first locking tab extending from said base portion, for abutting an end locking portion of said expandable band, said end locking portion of said expandable band forming said first locking region.

3. The expandable band locking mechanism of claim 2, wherein said locking member includes at least a second locking tab, extending from said base portion, for engaging at least one of a plurality of notches in said expandable band, said plurality of notches forming said second locking region.

4. The expandable band locking mechanism of claim 3, wherein said at least a second locking tab extends from said base portion at an angle with respect to said base portion.

5. The expandable band locking mechanism of claim 4, wherein said at least a second locking tab extends from said base portion at an obtuse angle with respect to said base portion such that said locking tab bends into engagement said at least one of said plurality of notches in said expandable band.

6. The expandable band locking mechanism of claim 1, wherein said expandable band includes first and second sides, and wherein said housing includes at least first and second side members, for retaining said locking member proximate said first and second sides of said expandable band.

7. The expandable band locking mechanism of claim 6, wherein said at least first and second side members include band engaging members, for engaging said expandable band on each said first and second sides of said expandable band.

8. The expandable band locking mechanism of claim 1, wherein said intermediate biasing member includes an elastomeric material.

9. The expandable band locking mechanism of claim 1, wherein said intermediate biasing member includes a spring member.

10. The expandable band locking mechanism of claim 1 wherein said housing includes a locking member engaging tab adapted to be bent into engagement with said locking member, for maintaining said locking member in the locked position.

11. An expandable sealing mechanism, for sealing a sealing element against a surface, said expandable sealing mechanism comprising:

an expandable band, for positioning against said sealing element and for expanding to seal said sealing element against said surface, said expandable band having an end locking region proximate one end of said expandable band and a plurality of adjustable locking elements spaced along a portion of said expandable band; and an expandable band locking mechanism, for locking said expandable band in an expanded position, said expandable band locking mechanism including:

a locking member having a first locking end removably engaged with said end locking region in said expandable band, and having a second locking end engaged with one of said plurality of adjustable locking elements in said expandable band; and a housing, for at least partially covering said locking member and for engaging with at least a portion of said expandable band.

12. The expandable sealing mechanism of claim 11, wherein said expandable band includes a plurality of ribs extending lengthwise along said expandable band, for providing multiple pressure points against said sealing element.

13. The expandable sealing mechanism of claim 12, wherein said plurality of ribs are formed by a plurality of corrugations.

14. The expandable sealing mechanism of claim 13, wherein each of said plurality of corrugations forms a substantially ninety degree angle with an adjacent corrugation.

15. The expandable sealing mechanism of claim 11, wherein said locking member engages said end locking region and said one of said plurality of adjustable locking elements on said expandable band such that said locking member is capable of moving to a subsequent one of said plurality of adjustable locking elements when said expandable band is expanded.

16. The expandable sealing mechanism of claim 11, wherein said plurality of adjustable locking elements include a plurality of notches in said expandable band.

17. The expandable sealing mechanism of claim 16, wherein said locking member includes a base portion, and wherein said second locking end of said locking member includes a locking tab extending at an angle with respect to said base portion, said locking tab engages one of said plurality of notches in said expandable band such that said locking member is adapted to move in a first direction to a subsequent one of said plurality of notches when said expandable band is expanded and is prevented from moving in a second direction opposite said first direction.

18. The expandable sealing mechanism of claim 11, wherein said expandable band locking mechanism further includes an intermediate biasing member, positioned between said locking member and said housing, for biasing said locking member toward a locking position.

19. The expandable sealing mechanism of claim 11 wherein said expandable band includes first and second side members, for retaining said locking member into slidable engagement with said expandable band.

20. An expandable sealing mechanism, for sealing a sealing element against an interior surface, said expandable sealing mechanism comprising:

an expandable band, for expanding to seal said sealing element against said interior surface, said expandable band having a plurality of protruding deviations extending in a circumferential direction around said expandable band, for providing a plurality of pressure points against said sealing element; and an expandable band locking mechanism, for locking said expandable band in an expanded position.

21. The expandable sealing mechanism of claim 20, wherein said plurality of protruding deviations are formed by a plurality of corrugations in said expandable band.

22. An expandable sealing mechanism, for sealing a sealing element against an interior surface, said expandable sealing mechanism comprising:

an expandable band, for expanding to seal said sealing element against said interior surface, said expandable band having a plurality of protruding deviations extending in a circumferential direction around said expandable band, for providing a plurality of pressure points circumferentially against said sealing element.

23. The expandable sealing mechanism of claim 22, wherein said plurality of protruding deviations are formed by a plurality of corrugations in said expandable band.

24. An expandable band locking mechanism, for locking an expandable band against at least one sealing element, said expandable band locking mechanism comprising:

a locking member having a first locking end, for locking with a first locking region in said expandable band, and having a second locking end for locking with a second locking region in said expandable band; and a housing, for at least partially covering said locking member and for engaging with at least a portion of said expandable band, wherein said housing includes a locking member engaging tab adapted to be bent into engagement with said locking member, for maintaining said locking member in the locked position.

* * * * *